April 4, 1950   H. A. W. KLINKHAMER   2,502,729
RECTIFYING INSTALLATION
Filed May 4, 1946

HENDRIK ABRAHAM WIJNAND KLINKHAMER
INVENTOR.

BY

AGENT.

Patented Apr. 4, 1950

2,502,729

UNITED STATES PATENT OFFICE 2,502,729

RECTIFYING INSTALLATION

Hendrik Abraham Wijnand Klinkhamer, Eindhoven, Netherlands, assignors, by mesne assignments, to Hartford National Bank and Trust Company, Hartford, Conn., as trustee Application May 4, 1946, Serial No. 667,255
In the Netherlands April 18, 1942

Section 1, Public Law 690, August 8, 1946
Patent expires April 18, 1962

4 Claims. (Cl. 320—22)

This invention relates to a rectifying installation, more particularly for use in a buffer battery circuit. It occurs that the buffer battery is partly discharged, for instance after an overloading period or after the network has been temporarily cut out due to some disturbance. In conjunction with the life of the battery it is then necessary to recharge it again to a sufficient degree. As a rule this is possible without the intervention of other means if very low load currents are consumed for a sufficient time, since the voltage-current characteristic of the rectifier usually exhibits a portion in this range where the voltage steadily increases as the current decreases. However, it often occurs in practice that the periods of small current consumption by the load are too short to permit the battery to be sufficiently charged in this way.

According to the invention this drawback is avoided when making use of a rectifying installation comprising two rectifiers one of which (auxiliary rectifier) consists of blocking-layer rectifiers and has a low output voltage relatively to the other (main rectifier), a switch being provided by means of which the auxiliary rectifier is either switched off or can be connected in series with the main rectifier, in which last-mentioned case the summed voltage substantially throughout the whole current range of the main rectifier is higher than the voltage of this rectifier alone.

A "low" output voltage of the auxiliary rectifier is to be understood to mean a voltage of the order of magnitude of 10% to 20% of that of the main rectifier.

By adding the auxiliary rectifier, for which a very cheap construction may be used, the desired higher voltage can be obtained for practically every load condition. After the battery has been charged to a sufficient degree the auxiliary rectifier is switched off again by means of the switch in order to prevent overloading.

It has already come to be known to obtain a higher output voltage of a rectifying installation used for charging batteries by the additional connection of a certain number of secondary windings of the feed transformer. In this case the rectifiers must be adapted for this higher feed voltage, which in the case of a larger type of rectifier having been used for this reason, involves higher cost than the use of the small auxiliary rectifier according to the invention. When making use of blocking-layer rectifiers in the main rectifying circuit a plurality of rectifiers per branch must be connected in series when using the higher voltage, which may involve the necessity of more complicated switches and in addition an undue loss of voltage. In both cases these drawbacks are avoided by the auxiliary rectifier according to the invention which is switched on or off by means of a unipolar switch. In charging a buffer battery the additional advantage occurs that the dry rectifiers of the auxiliary rectifier can be loaded to a higher degree in regard to current than is normally usual, since the auxiliary rectifier is operative only for comparatively short periods so that the life of the dry rectifiers does not play an essential part.

According to another feature of the invention the circuit comprises a resistance which in the state, in which the auxiliary rectifier is disconnected, is short-circuited by the switch and which furthermore is on the one hand given at the utmost such a value that on changing-over to series-connection the voltage impulse then occurring is sufficiently damped to prevent damaging of the installation and more particularly of the main rectifiers, and on the other hand has at least such a value that the auxiliary rectifier is not overloaded in series-connection. The expression "overloading" is to be understood to mean such a load that the effective share of the auxiliary rectifier in the circuit is not reduced to such a degree that the installation would operate uneconomically.

The invention will be more fully explained, by way of example, by means of the schematically represented figures.

Figure 1:
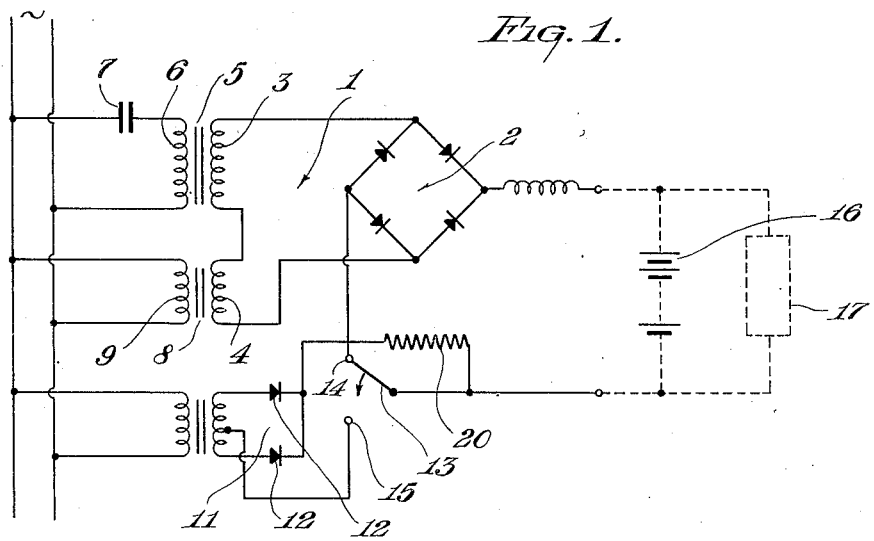
Figure 1 is a diagrammatic showing of the alleged invention.

In Figure 1 the main rectifier 1 consists of a Grätz-circuit of blocking-layer rectifiers 2, which is fed from the two series-connected secondary windings 3 and 4. The secondary winding 3 forms part of a saturated transformer 5 whose primary 6 is connected to the alternating current network in series with a condenser 7. The secondary winding 4 belongs to a normal transformer 8 whose primary 9 is also connected to the network.

Figure 2:
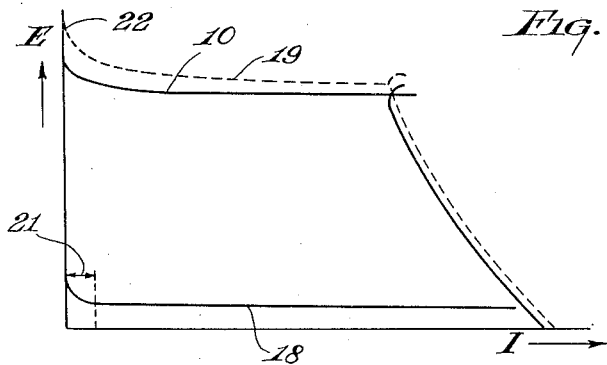
Figure 2 is a graph showing the output voltages of the respective rectifiers with respect to current.

Such a circuit has already been proposed and in the case of the parts having a suitable size yields a voltage/current characteristic designated by 10 in Figure 2. With small loads this curve exhibits a horizontal part whose voltage varies only slightly and with higher loads it exhibits a dropping part yielding a limitation of the current, which is very suitable more particularly for battery charging.

According to the invention use is made of an auxiliary rectifier 11 consisting of blocking layer rectifiers 12, a unipolar switch 13 being provided by means of which the auxiliary rectifier 11 can either be disconnected (in position 14) or be connected in series with the main rectifier 2 (in position 15) so that in the last-mentioned case the buffer battery 16 and the load 17 are fed by the summed voltage of the two rectifiers.

In Figure 2 the output voltage 18 of the auxiliary rectifier 11 is so chosen as to have a low output voltage relatively to that (10) of the main rectifier 1, and, if both rectifiers are connected in series with each other, the summed voltage 19 substantially throughout the current range of the main rectifier is higher than the voltage of this rectifier alone.

In addition to the advantages stated in the preamble this circuit may yield the following advantages.

In fact, in the case of the parts having suitable proportions the main rectifier 2 has the property that the range of substantially constant voltage of the curve 10 varies only slightly with a varying network voltage and is lower as the network voltage is higher. But even this slight variation may be undesirable under certain conditions. When making use of the auxiliary rectifier this variation can be compensated to a larger or smaller degree above a certain limit, in which case the switch 13, for instance in accordance with the output voltage, must be changed-over automatically to the position 15. If the output voltage of the main rectifier increases on account of a decrease of the network voltage above a definite value the switch 13 may be caused to resume its initial position 14. In this way a larger degree of independence from the network voltage can then be obtained without using the auxiliary rectifier 12. This is why in this case the operation of the device is not limited to its application in charging buffer batteries.

Another advantage of a device referred to consists in that the pulsation of the output voltage is not enlarged by addition of the auxiliary rectifier, but is slightly reduced under certain conditions (about 20%), since the alternating feed voltage of the rectifiers 12 has a different phase than the feed voltage of the rectifying circuit 2. Consequently the phase of the pulsation EMF of the two series-connected rectifiers is different which, as is well-known, renders the smoothing choke more active. Furthermore, according to the invention, a resistance 20 is available which in the state in which the auxiliary rectifier is disconnected, is short-circuited by the switch. This resistance has at the utmost such a value that on changing over to series-connection (position 15) the voltage impulse then occurring is sufficiently damped, owing to switching off of the load 16, 17, as to prevent the rectifiers 2 from being damaged. On the other hand the resistance 20 has at least such a value that the auxiliary rectifier 11 has a sufficient share in forming the resulting curve 19 in Figure 2.

In addition the resistance 20 has the advantage that the part 21 of the curve 18 in Figure 2 is cut since the resistance for the auxiliary rectifier acts as a minimum base load. The voltage peak in the part 21, which in the case of being added to the voltage peak of the curve 10 would yield a higher peak 22 on the curve 19, which might be detrimental with very small loads, is thus made inoffensive. The practical construction of the represented circuit may be simplified by combining the transformer 8 with the feed transformer of the auxiliary rectifier 11, whereby the transformer 8 is but slightly enlarged.

Figure 3:
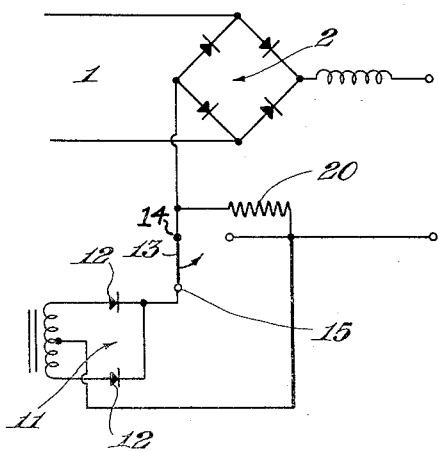
Figure 3 is a showing in part of a modification of the circuit shown in Figure 1.

Finally it is to be noted that the switch 13 may also be provided at the point 14 as a center of rotation in which case the circuit must be realised as shown in Figure 3. However this does not constitute a principal modification.

It will be appreciated that the use of the invention is not limited to the particular form of the curve 10 shown in Figure 2, which has proved to be very advantageous in certain cases, but generally holds also for curves having another usual form.

What I claim is:

1. A system for maintaining a battery connected to a load in a charged condition, said system comprising a main rectifying circuit to produce a charging voltage for said battery, said main circuit having a voltage-current characteristic wherein as the current increases to a given value the voltage remains substantially constant in value and as the current increases above said given value the voltage drops as a function of said increase, an auxiliary rectifying circuit to produce a voltage which is low relative to said constant value voltage, and switching means to connect said auxiliary circuit to said battery in series with said main circuit, whereby the total voltage applied to said battery throughout the current range of said main circuit exceeds the voltage output of said main circuit.

2. A system for maintaining a battery connected to a load in a charged condition, said system comprising a main rectifying circuit to produce a charging voltage for said battery, said main circuit having a voltage-current characteristic wherein as the current increases to a given value the voltage remains substantially constant in value and as the current increases above said given value the voltage drops as a function of said increase, an auxiliary rectifying circuit to produce a voltage which is low relative to said constant value voltage, a damping resistance for said auxiliary circuit, and switching means to connect said auxiliary circuit to said battery in series with said main circuit and simultaneously to shunt said resistance across said auxiliary circuit, whereby the total voltage applied to said battery throughout the current range of said main circuit exceeds the voltage output of said main circuit.

3. A system for maintaining a battery connected to a load in a charged condition, said system comprising an alternating current source, a main rectifying circuit to produce a charging voltage for said battery and including a saturable transformer having a primary and a secondary, a non-saturable transformer having a primary and a secondary, rectifier means and a condenser, the primary of said saturable transformer being coupled through said condenser to said source, the primary of said non-saturable transformer being connected to said source, the secondaries of said transformers being connected in series and through said rectifier means to said battery, said main circuit having a voltage-current characteristic wherein as the current increases to a given value the voltage remains substantially constant in value and as the current increases above said given value the voltage drops as a function of said increase, an auxiliary rectifying circuit energized by said source for producing a voltage which is low relative to said constant value voltage, and switching means to connect said auxiliary circuit to said battery in series with said main circuit.

4. A system for maintaining a battery connected to a load in a charged condition, said system comprising an alternating-current source, a main rectifying circuit to produce a charging voltage for said battery and including a saturable transformer having a primary and a secondary, a non-saturable transformer having a primary and a secondary, a bridge rectifier having input and output diagonals and a condenser, the primary of said saturable transformer being coupled through said condenser to said source, the primary of said non-saturable transformer being connected to said source, the secondaries of said transformers being connected in series to the input diagonals of said bridge rectifier, the output diagonals of said bridge being connected across said battery, said main circuit having a voltage-current characteristic wherein as the current increases to a given value the voltage remains substantially constant in value and as the current increases above said value the voltage drops as a function of said increase, an auxiliary rectifying circuit energized by said source for producing a voltage which is low relative to said constant value voltage, a damping resistance for said auxiliary circuit connected in series with said battery and said output diagonals, and selective switching means for connecting in a first position said auxiliary circuit across said damping resistance and in a second position a short circuit across said damping resistance.

HENDRIK ABRAHAM WIJNAND
KLINKHAMER.

REFERENCES CITED

The following references are of record in the file of this patent:

UNITED STATES PATENTS

| Number | Name | Date |
|---|---|---|
| Re. 19,848 | Beetem | Feb. 11, 1936 |
| 921,893 | Russell | May 18, 1909 |
| 1,366,629 | Arendt | Jan. 5, 1921 |
| 1,837,738 | Vencill | Dec. 22, 1931 |
| 1,882,473 | Beetem | Oct. 11, 1932 |
| 2,067,420 | Seeger et al. | Jan. 12, 1937 |
| 2,272,745 | Hinds et al. | Feb. 10, 1942 |
| 2,300,296 | Langabeer et al. | Oct. 27, 1942 |
| 2,431,312 | Cronvall | Nov. 25, 1947 |